UNITED STATES PATENT OFFICE.

WILLIAM D. BEAUMONT, OF MOBILE, ALABAMA.

IMPROVEMENT IN ARTIFICIAL FUEL.

Specification forming part of Letters Patent No. 13,056, dated June 12, 1855.

*To all whom it may concern:*

Be it known that I, WILLIAM D. BEAUMONT, of the city and county of Mobile, and State of Alabama, have invented a new and useful Fuel Composition; and I do hereby declare that the following is a full, clear, and exact description of the same and its preparation.

The nature of my invention consists in the formation of an artificial fuel by combining or mixing fine coal-screenings, clay or marl, pine straw or litter, crude turpentine and gypsum, the proportions and mode of preparation being as follows: Before proceeding to the formation of the fuel the component parts require the following preliminary preparation: The clay is to be ground by any mill adapted to the purpose. The turpentine, which must be dry and brittle, is to be reduced to a powdered or finely granular condition by mill or mortar. The gypsum is to be ground. The pine straw or litter, which consists of fallen pine-leaves, is to be finely cut by a suitable instrument, and fine coal screenings and dust to be selected. After the above preparation of materials the turpentine and gypsum, in the proportion of about one hundred and fifty pounds of each to a ton of clay, are to be thoroughly mixed with the clay in a dry state by stirring in a mixing-mill of ordinary construction. The powdered turpentine by this operation attaches itself closely to the particles of clay with which it comes in contact. The cut pine-straw is then added in about the proportion of four hundred pounds to the ton of clay, and is well disseminated through the mass. Coal-screenings, about equal in weight to the mixture of clay, turpentine, gypsum, and pine-straw above described, are then added, and the whole well worked together with water, in a manner similar to the tempering of mortar for the manufacture of brick, until the several substances are well incorporated and the mass is of proper consistency to be molded into balls or cakes. After molding, the balls or cakes are allowed to dry in the sun for about ten hours. The fuel is then ready for use, and may be ignited in the same manner as ordinary coal.

The pine-straw, which contains considerable resin, performs an important function by rapidly burning out and opening passages through the mass for the diffusion of heat, thus aiding materially the ignition of the fuel. It is, moreover, a waste article in great abundance in the southern portions of the United States, and in this connection is utilized as fuel. The properties of the turpentine are well known, and, employed as herein described, aid the adhesion of the parts and assists combustion. The gypsum is used to assist the hardening of the composition.

The proportions given are not designed to be strictly adhered to, as they may be varied according to the purpose for which the fuel is intended.

I claim—

The manufacture of a new article of fuel composed of coal-screenings, clay or marl, pine straw or litter, crude turpentine and gypsum or their equivalents, mixed in the proportions substantially as set forth.

In testimony whereof I have hereunto signed my name before two subscribing witnesses.

WILLIAM D. BEAUMONT.

Witnesses:
G. E. SHERWIN,
JAS. D. CLARY.